United States Patent
Kodaira et al.

(10) Patent No.: US 7,771,831 B2
(45) Date of Patent: Aug. 10, 2010

(54) INFRARED SHIELDING FILM-COATED GLASS PLATE AND PROCESS FOR ITS PRODUCTION

(75) Inventors: Hirokazu Kodaira, Tokyo (JP); Hiroyuki Tomonaga, Tokyo (JP); Kazuo Sunahara, Tokyo (JP); Yuichi Yamamoto, Tokyo (JP); Daisuke Kobayashi, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 488 days.

(21) Appl. No.: 11/695,893

(22) Filed: Apr. 3, 2007

(65) Prior Publication Data

US 2007/0292695 A1    Dec. 20, 2007

(30) Foreign Application Priority Data

Apr. 4, 2006    (JP)    ............................. 2006-103366

(51) Int. Cl.
*B32B 15/04*    (2006.01)
*B32B 17/06*    (2006.01)

(52) U.S. Cl. .................. 428/432; 428/698; 428/701

(58) Field of Classification Search ................. 428/432, 428/689, 698, 701, 702; 427/162
See application file for complete search history.

(56) References Cited

U.S. PATENT DOCUMENTS 5,518,810 A * 5/1996 Nishihara et al. ........... 428/328
6,221,945 B1 4/2001 Kuno et al.
2005/0084718 A1* 4/2005 Tomonaga et al. .......... 428/698
2005/0164014 A1 7/2005 Tomonaga et al.

FOREIGN PATENT DOCUMENTS

| EP | 1 524 247 A1 | 4/2005 |
|---|---|---|
| JP | 7-70482 | 3/1995 |
| JP | 8-41441 | 2/1996 |
| JP | 10-279329 | 10/1998 |
| WO | WO 2006/112370 A1 | 10/2006 |
| WO | WO 2006/112371 A1 | 10/2006 |

OTHER PUBLICATIONS

U.S. Appl. No. 11/872,301, filed Oct. 15, 2007, Tomonaga, et al.
U.S. Appl. No. 11/627,605, filed Jan. 26, 2007, Kodaira, et al.

* cited by examiner

*Primary Examiner*—Jennifer C McNeil
*Assistant Examiner*—Lauren Robinson
(74) *Attorney, Agent, or Firm*—Oblon, Spivak, McClelland, Maier & Neustadt, L.L.P.

(57) ABSTRACT

An infrared shielding film-coated glass plate comprising a glass substrate and an infrared shielding film formed thereon, wherein the infrared shielding film comprises fine ITO particles having an average primary particle diameter of at most 100 nm dispersed in a matrix containing silicon oxide as the main component and containing nitrogen in an amount of at least 2 at % based on Si and has a film thickness of from 200 to 3,000 nm.

17 Claims, 1 Drawing Sheet

INFRARED SHIELDING FILM-COATED GLASS PLATE AND PROCESS FOR ITS PRODUCTION

Figure 1:
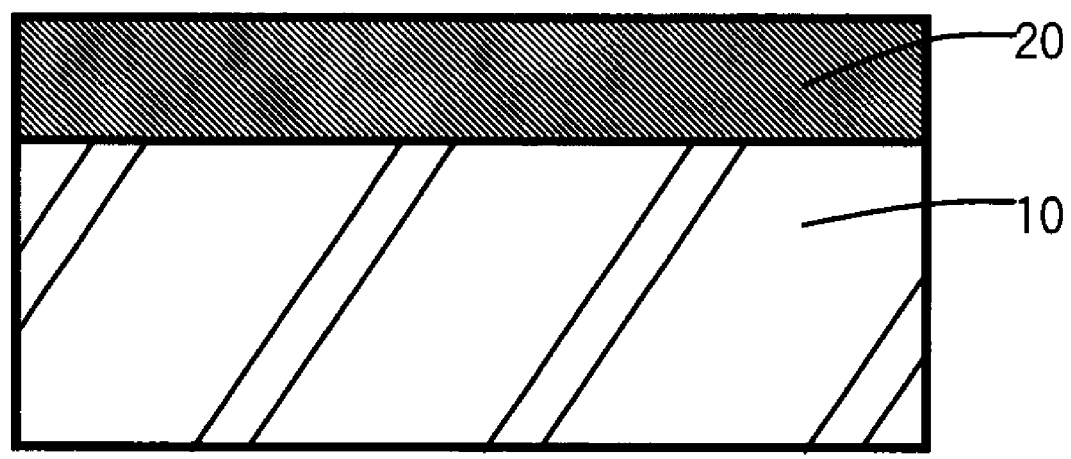

The present invention relates to an infrared shielding film-coated glass plate and a process for its production.

In recent years, an infrared shielding film-coated glass has been employed for the purpose of shielding infrared rays entering into a vehicle or building through a vehicle glass or building glass thereby to reduce the temperature rise in the vehicle or building or to reduce the air conditioning load (e.g. JP-A-10-279329). Further, glass for vehicles or glass for building is required to have a high visible light transmittance to secure safety or visibility, in many cases.

Heretofore, there have been many proposals to impart an infrared shielding property to a glass plate thereby to increase a heat-shielding performance. For example, there has been a proposal to incorporate infrared absorptive ions in glass thereby to impart an infrared shielding property to a glass plate itself, or a proposal to form an electroconductive film on the surface of a glass substrate thereby to impart an infrared shielding property, and such a proposal has been practically employed.

However, with respect to a glass plate having infrared absorptive ions incorporated in glass, it has been difficult to increase the infrared absorptivity while maintaining the visible light transmittance at a high level, and particularly, it has been difficult to increase the shielding performance against intermediate wavelength infrared rays having a wavelength of from 1.5 μm to 2.7 μm. On the other hand, by the method of forming an electroconductive film on the surface of a glass substrate, radiowaves can not transmit through the glass due to the electroconductive film, which tends to bring about an inconvenience as radiowave transmittance through an opening has been required along with the progress in mobile telecommunication in recent years. Thus, it has been very difficult to produce a glass plate having transparency, infrared-shielding property and radiowave transmittance at the same time.

In order to solve the above-mentioned problems, a method has been proposed wherein a glass substrate is coated with a coating film having fine particles of tin oxide-doped indium oxide (ITO) capable of providing a high infrared shielding performance dispersed in a binder, thereby to provide an infrared shielding film-coated glass plate (JP-A-7-70482 and JP-A-8-41441). By this method, an infrared shielding property can be imparted while maintaining a relatively high visible light transmittance, and at the same time, the electrical conductivity as the film will be suppressed by the presence of the binder, whereby it will be possible to impart radiowave transmittance.

However, the binder to be usually used in this system was an organic binder or an inorganic binder, and the organic binder had a problem that the mechanical durability of the coating film thereby obtainable was poor, and the coating film could not be used at a site where mechanical durability was required, such as a door glass for an automobile. On the other hand, as the inorganic binder, a material obtained by a sol/gel method was frequently employed, and even then, in order to produce a coating film excellent in durability so that it was capable of being used at a site where the above-mentioned mechanical durability was required, it was necessary to carry out heat treatment at a relatively high temperature, for example, at a temperature of at least 400° C., preferably at least 500° C.

However, the ITO electric conductor is semiconductor of oxygen-deficient type, and if it is held at a temperature of at least 300° C. in the presence of oxygen, free electrons will be lost by oxidation, whereby the infrared shielding property will be lost. Accordingly, in order to produce a coating film excellent in mechanical durability while maintaining the infrared shielding property, it is required to carry out heat treatment in a non-oxidizing atmosphere which is totally disadvantageous from the viewpoint of the costs, or the surface of the coating film having infrared-shielding property has to be further coated with an ITO antioxidant layer, or expensive fine ITO particles have to be incorporated in the coating film in a large amount, such being uneconomical.

Under these circumstances, it is an object of the present invention to provide an infrared shielding film-coated glass plate which has a high visible light transmittance, a low infrared transmittance and a high radiowave transmittance and which is capable of being applied to a site where mechanical and chemical durability is highly required, such as a window glass plate for an automobile, and a production process to obtain such an infrared shielding film-coated glass plate economically.

The present invention provides an infrared shielding film-coated glass plate comprising a glass substrate and an infrared shielding film formed thereon, wherein the infrared shielding film comprises fine ITO particles having an average primary particle diameter of at most 100 nm dispersed in a matrix containing silicon oxide as the main component and containing nitrogen in an amount of at least 2 at % based on Si and has a film thickness of from 200 to 3,000 nm.

The present invention further provides a process for producing an infrared shielding film-coated glass plate, which comprises a step of applying a dispersion liquid comprising fine ITO particles having an average primary particle diameter of at most 100 nm in a content of from 1 to 10 mass % based on the total mass, a nitrogen-containing silicon compound capable of forming a silicon oxide gel and an organic solvent, to the surface of a glass substrate to form a fine ITO particles-dispersed layer containing the nitrogen-containing silicon compound and/or containing a gel of the nitrogen-containing silicon compound, and a step of curing the above layer.

The infrared shielding film-coated glass plate of the present invention has a high visible light transmittance, a low infrared transmittance, a high radiowave transmittance and excellent mechanical durability and chemical resistance. Further, according to the production process of the present invention, not only firing at high temperature as in a conventional method is unnecessary but also the amount of use of fine ITO particles can be significantly reduced as compared with the conventional method, and thus the production cost can be reduced.

In the accompanying drawing:

FIG. 1 is a cross section illustrating an infrared shielding film-coated glass plate according to one embodiment of the present invention.

Now, the constituting elements of the present invention will be described in detail.

In the infrared shielding film (numerical reference 20 in FIG. 1) of the present invention, the fine ITO particles having an average primary particle diameter of at most 100 nm, are a constituting element to provide the infrared shielding property, and it is important that the average primary particle diameter is at most 100 nm. If the average primary particle diameter is larger than this level, such tends to cause a haze due to scattering when formed into a film on a glass substrate, such being undesirable. The average primary particle diameter is more preferably from 5 to 65 nm with a view to maintaining the transparency.

The mixing ratio of tin oxide to indium oxide in the fine ITO particles to provide the infrared shielding property, is required to be In/Sn=5 to 40, particularly preferably In/Sn=7 to 25, when represented by the ratio of the atomicity of indium to the atomicity of tin (In/Sn).

The film thickness of the infrared shielding film of the present invention is from 200 to 3,000 nm. If the thickness is less than 200 nm, it tends to be difficult to sufficiently develop the infrared shielding property, and if it exceeds 3,000 nm, cracking is likely to result during the formation of the coating film, or the visible light transmittance tends to be low. The film thickness is preferably from 400 to 2,000 nm, whereby an infrared shielding film having a stable infrared shielding property and also excellent in the visible light transmittance, is likely to be obtained. The film thickness is particularly preferably from 500 to 1,500 nm.

In the present invention, the matrix containing silicon oxide as the main component and containing nitrogen in an amount of at least 2 at % based on Si (hereinafter sometimes referred to as nitrogen-containing silicon oxide matrix) serves as a binder for the above fine ITO particles to increase the film hardness and serves to impart the adhesion of the infrared shielding film to the glass substrate. Here, there is a possibility that nitrogen has a function to reduce the fine ITO particles in the film, and it is considered that a high infrared shielding property can be achieved with a small amount of ITO resultingly. The content is preferably at least 3 at %, particularly preferably at least 5 at %. On the other hand, the above content is preferably at most 20 at %, whereby the adhesion of the infrared shielding film to the surface of the glass substrate can be sufficiently maintained.

The fine ITO particles themselves are excellent in electrical conductivity, and accordingly, if the fine ITO particles are continuously in close contact with one another in the coating film, the coating film itself will show electrical conductivity and thus will adversely affect the radiowave transmittance. The nitrogen-containing silicon oxide matrix is effective to limit the contact of the fine ITO particles and thereby to prevent the coating film itself from becoming an electroconductive film, and thus, it is an important constituting element to prevent the radiowave transmittance of the coating film. The nitrogen-containing silicon oxide is a matrix material comprising Si—O—Si bonds. Part of nitrogen may be unevenly present on the surface of the fine ITO particles. Further, the matrix material may contain nitrogen atoms bonded to Si. Namely, part of silicon oxide in the matrix material may be silicon oxynitride.

Further, part of silicon oxide in the matrix material may be replaced with titanium oxide. Titanium oxide has a function to accelerate curing of the coating film at low temperature, and it is possible to replace silicon oxide in the matrix material with titanium oxide in an amount up to a maximum of about 50 mol % based on the amount of silicon oxide present in the matrix material. Here, titanium oxide is not required to be $TiO_2$ in a strict sense, and a matrix material comprising Ti—O—Ti bonds or Si—O—Ti bonds is preferably formed. Further, part of titanium oxide may be unevenly present on the surface of the fine ITO particles. Further, the matrix material may contain nitrogen atoms bonded to Ti. Further, in the matrix material, components may be contained in a small amount with limits of about 5% by mass ratio, such as C, Sn, Zr, Al, B, P, Nb and Ta.

In the present invention, the deposition amount of the fine ITO particles in the infrared shielding film is preferably from 0.2 to 1.0 $g/m^2$. When the deposition amount is at least 0.2 $g/m^2$, the infrared shielding property will be sufficiently developed. Further, when the deposition amount is at most 1.0 $g/m^2$, an inexpensive infrared shielding film will be obtained without impairing the infrared shielding property and the transparency. The deposition amount is more preferably from 0.2 to 0.7 $g/m^2$, more preferably from 0.2 to 0.5 $g/m^2$.

The mass ratio of the fine ITO particles to the nitrogen-containing silicon oxide matrix in the infrared shielding film is preferably (fine ITO particles)/(matrix)=10/90 to 45/55. By the ratio being at most 45/55, the adhesion or hardness of the coating film will be kept, and the radiowave transmittance is likely to be maintained. Further, by the ratio being at least 10/90, the infrared shielding property will sufficiently be developed. More preferably, the mass ratio of (fine ITO particles)/(matrix)=20/80 to 40/60.

The infrared shielding film-coated glass plate of the present invention is so constituted that the above infrared shielding film 20 is adjacent to the surface of a glass substrate 10.

When the infrared shielding film-coated glass plate of the present invention is used as a window glass plate for an automobile, it is required to have a high visible light transmittance in some cases depending upon the site, and for such a case, the visible light transmittance is preferably at least 70% as the infrared shielding film-coated glass plate. The visible light transmittance means a visible light transmittance determined by the calculating formula as stipulated in JIS R3212 (1998).

Further, the transparency is very important not only in a case where the infrared shielding film-coated glass plate is used as a window glass plate for an automobile but also in a case where it is used as a usual window glass plate. Thus, the haze is preferably less than 1.0% as the infrared shielding film-coated glass plate.

Further, when the infrared shielding film-coated glass plate of the present invention is used as a window glass plate for an automobile, it is required to have high mechanical durability in some cases depending upon the site, and for such a case, the increase in haze is preferably at most 5%, more preferably at most 3%, as between before and after a 1,000 rotation abrasion test carried out by a CS-10F abrasion wheel in accordance with the method disclosed in JIS R3212 (1998).

The glass substrate to be used in the present invention is not particularly limited, and a glass plate made of an inorganic glass material or a glass plate made of an organic glass material may, for example, be mentioned. For a window of an automobile particularly a windshield or a sliding window, it is preferred to use a glass plate made of an inorganic glass material. The inorganic glass material may be a common glass material such as soda lime glass, borosilicate glass, alkali-free glass or quartz glass.

As the inorganic glass material, glass which absorbs ultraviolet rays and infrared rays may also be used. Specifically, it is particularly effective to employ, as the glass substrate, a glass plate made of an inorganic glass material, of which the visible light transmittance as stipulated in JIS R3212 (1998) is at least 70%, the transmittance to a light having a wavelength of 1 μm is at most 30%, and the transmittance to a light having a wavelength of 2 μm is from 40 to 70%. With the infrared shielding film in the present invention, the shielding property in a near infrared region near 1 μm is not so high, and by using a glass plate having a high shielding performance against light having a wavelength near 1 μm as a glass substrate, it is possible to provide an excellent infrared shielding property over the entire infrared region.

The infrared shielding film-coated glass plate of the present invention can be produced as follows. Namely, 1) A dispersion liquid comprising fine ITO particles having an average primary particle diameter of at most 100 nm in a content of from 1 to 10 mass % based on the total mass, a nitrogen-containing silicon compound capable of forming a silicon oxide gel (hereinafter sometimes referred to simply as a silicon compound) and an organic solvent is applied to the surface of a glass substrate to form a fine ITO particles-dispersed layer containing the silicon compound and/or containing a gel of the silicon compound, and 2) The above layer is cured.

The agglomerated state of the fine ITO particles in the fine ITO particles-dispersed layer after curing, reflects the agglomerated state in the dispersion liquid. Accordingly, in order to maintain the transparency or radiowave transmittance in the coating film, the fine ITO particles are required to be highly dispersed in the dispersion liquid. As such a dispersed state, preferred is a monodispersed state with a number average agglomerated particle diameter of preferably at most 500 nm, more preferably at most 200 nm, furthermore preferably at most 100 nm. The organic solvent as a dispersant is not particularly limited so long as it can dissolve the silicon compound therein. Specifically, it may, for example, be an aliphatic hydrocarbon, an aromatic hydrocarbon, a ketone, an ester, an ether, an alcohol or a halogenated hydrocarbon. Needless to say, such organic solvents may be used alone or as mixed. As the method for dispersion, a known method may be employed. For example, ultrasonic wave irradiation, a homogenizer, a media mill such as a ball mill, a bead mill, a sand mill or a paint shaker, or a high pressure impact mill such as a jet mill or a nanomizer, may be employed.

The fine ITO particles in the dispersion liquid may be known particles. Regarding the crystal system, by employing the nitrogen-containing silicon oxide matrix of the present invention, not only common cubic ITO but also hexagonal ITO which is generally considered to be inferior in the infrared shielding property, can be used.

The fine ITO particles are contained in a content of from 1 to 10 mass % based on the total mass of the dispersion liquid. By the dispersion liquid containing the fine ITO particles in a content of at least 1 mass % based on the total mass, an infrared shielding film having a desired infrared shielding property is likely to be obtained by a single film-forming process. On the other hand, if the content of the fine ITO particles based on the total mass of the dispersion liquid exceeds 10 mass %, the stability of the dispersion liquid may be low. More preferably, the content of the fine ITO particles is preferably from 1 to 7 mass % based on the total mass of the dispersion liquid.

The silicon compound is a component (hereinafter sometimes referred to as a siloxane matrix material) which is capable of becoming a silicon oxide matrix having siloxane bonds by heating, and is a material with which nitrogen is left in the infrared shielding film. Specifically, it may, for example, be a polysilazane, a nitrogen-containing silicone resin, a nitrogen-containing silane coupling agent (such as an aminosilane) or a partial hydrolysate thereof, and among them, a polysilazane is particularly suitable. Of course, such a nitrogen-containing silicon compound may be mixed with a siloxane matrix material containing no nitrogen, specifically, an alkoxysilane to be used in a sol/gel method, a partial hydrolysate of the alkoxysilane, a partially hydrolyzed condensate of the alkoxysilane, water glass or a silicone.

The polysilazane is a generic name for linear or cyclic compounds having a structure represented by —SiR$^1_2$—NR$^2$—SiR$^1_2$— (wherein R$^1$ and R$^2$ each independently are hydrogen or a hydrocarbon group), and is a material which forms a Si—O—Si network by decomposition of the Si—NR$^2$—Si bonds by heating or by reaction with moisture. A silicon oxide type coating film obtainable from a polysilazane has high mechanical durability and gas barrier properties as compared with a silicon oxide type coating film obtainable from a tetraalkoxysilane or the like. The above reaction does not usually proceed completely by heating up to about 300° C., and it is considered that nitrogen remains in the film as Si—N—Si bonds or as another bonds and that silicon oxynitride is formed at least in part. Further, the mass ratios (such as the after-mentioned mass ratio (fine ITO particles)/(SiO$_2$)) with respect to such a nitrogen-containing silicon oxide are values calculated assuming that all silicon atoms are silicon atoms in silicon oxide (values calculated as silicon oxide).

Further, in the present invention, the polysilazane is preferably a perhydropolysilazane of the above formula wherein R$^1$=R$^2$=H, a partially organic polysilazane wherein R$^1$ is a hydrocarbon group such as a methyl group and R$^2$=H, or a mixture thereof. An infrared shielding film formed by using such a polysilazane has high mechanical strength and oxygen barrier properties and is very suitable. A particularly preferred polysilazane is a perhydropolysilazane.

The number average molecular weight of the polysilazane is preferably from about 500 to about 5,000. When the number average molecular weight is at least 500, curing will effectively proceed. Further, when the number average molecular weight is at most 5,000, an appropriate number of crosslinking sites at the time of curing will be maintained, and cracking or pinholes in the coating film will be prevented.

By using the silicon compound of the present invention, the amount of the fine ITO particles required to develop the same level of the infrared shielding property can be significantly reduced as compared with a conventional method. The detailed mechanism is unclear but is considered to be influenced by the presence of nitrogen in the infrared shielding film. By reducing the content of the fine ITO particles, it is possible to sufficiently maintain the transparence of the infrared shielding film, specifically, it is possible to maintain the haze of such an infrared shielding film-coated glass plate as having a solar energy transmittance of at most 45% as the infrared shielding film-coated glass plate, to be less than 1.0%. It is preferred to maintain the haze to be at most 0.7%, particularly preferably at most 0.5%. Further, by using the silicon compound of the present invention, an infrared shielding film-coated glass plate having a sufficient infrared shielding property will be obtained with a low content of fine ITO particles. More realistically, an infrared shielding film-coated glass plate having a solar energy transmittance of at most 42% as the infrared shielding film-coated glass plate and having a haze maintained to be less than 1.0%, preferably at most 0.7%, more preferably at most 0.5%, will be obtained.

In the production process of the present invention, the mass ratio of the fine ITO particles to the silicon compound in the dispersion liquid is preferably (fine ITO particles)/(SiO$_2$) =10/90 to 45/55. By the above ratio being at least 10/90, an infrared shielding film having a desired infrared shielding property is likely to be obtained by a single film-forming process. On the other hand, by the above ratio being at most 45/55, dispersibility of the fine ITO particles in the infrared shielding film will be improved, and cost reduction becomes possible.

Further, the dispersion liquid of the present invention may contain a titanium compound capable of forming a titanium oxide gel. Such a titanium compound is preferably an organic titanium compound. The organic titanium compound has a function to accelerate curing of the silicon compound in the after-mentioned curing step, whereby mechanical strength will be developed by curing at lower temperature. Such an organic titanium compound may, for example, be a titanium tetraalkoxide compound, a titanium chelate compound, a titanium acylate compound or a titanate coupling agent, and the titanium compound in the present invention is preferably a titanium tetraalkoxide compound or a titanium chelate compound. The titanium tetraalkoxide compound is preferably a compound of the formula Ti(OR')$_4$ (wherein R' is a $C_{1-8}$ hydrocarbon group), and specifically, it may, for example, be titanium tetra-n-butoxide, titanium tetraisopropoxide, titanium tetramethoxide, titanium tetraethoxide or tetrakis(2-ethylhexyloxy)titanium. The titanium chelate compound is preferably a chelate compound of a titanium alkoxide, and specifically, it may, for example, be diisopropoxybis(ethylacetoacetate)titanium, di-n-butoxybis(ethylacetoacetate)titanium, diisopropoxybis(acetylacetonato)titanium, di-n-butoxybis(acetylacetonato)titanium or titanium tetraacetylacetonate. From the viewpoint of handling efficiency, the titanium compound in the present invention is preferably a titanium chelate compound, and from the viewpoint of the stability of the dispersion liquid, diisopropoxybis(ethylacetoacetate)titanium or titanium tetraacetylacetonate is particularly preferred. The titanium compound may be added after preparation of the dispersion liquid, or may be added during preparation of the dispersion liquid.

The dispersion liquid thus obtained is applied to the surface of a glass substrate to prepare a fine ITO particles-dispersed layer. The application method is not particularly limited, and a known method such as a dip coating method, a spin coating method, a spray coating method, a flexographic printing method, a screen printing method, a gravure printing method, a roll coating method, a meniscus coating method or a die coating method may, for example, be used. After application, it is preferred to dry the coating film at a temperature of at most 200° C. before the after-mentioned curing by heating. In the drying step, it is the main purpose to remove the solvent component, etc. in the coating film, and even when the temperature is raised higher than this, no particular effect can be expected, such being uneconomical. The drying time is preferably from about 30 seconds to about 2 hours. The drying may be carried out either in atmospheric air or in a non-oxidizing atmosphere. However, no particular advantage in the non-oxidizing atmosphere can be expected.

Further, it is possible to carry out this drying step under reduced pressure. The ultimate vacuum is from about 10 kN/m$^2$ to about 0.10 kN/m$^2$, and the treatment time is from 10 seconds to 30 minutes.

Of course, the drying step may not be carried out, or it is possible to dry the coating film simultaneously in the following curing step.

After formation of the fine ITO particles-dispersed layer on the surface of the glass substrate as mentioned above, it is preferred to heat the glass substrate at such a temperature that the glass substrate temperature is at most 300° C. to cure the silicon compound thereby to form an infrared shielding film. The curing time is usually from about 30 seconds to about 10 hours.

Further, in a case where a polysilazane is used as the silicon compound, curing by moisture in the atmosphere is possible other than the heat treatment. Namely, the glass substrate is maintained under a humidity of at least about 80% for from 10 minutes to several days, or under a humidity of from 40 to 80% for from several days to several weeks, whereby curing will proceed, and a coating film having a sufficient strength will be obtained.

As mentioned above, according to the production process of the present invention, a glass plate for an automobile or for building, provided with an infrared shielding film having high durability, can be efficiently and economically produced without firing at high temperature. In this production process, it is particularly preferred to use, as a glass substrate, tempered glass prepared by tempering treatment comprising heating a glass plate comprising inorganic glass materials in atmospheric air to a temperature near from 650 to 700° C., followed by quenching, whereby a tempered glass plate for an automobile or for building, provided with an infrared shielding film having high durability, can be efficiently and economically produced.

Now, the present invention will be described in further detail with reference to Examples. However, it should be understood that the present invention is by no means restricted to such specific Examples. Further, the average primary particle diameter of the fine ITO particles in the obtained infrared shielding film was determined by observation by a transmission electron microscope (TEM), and the obtained infrared shielding film-coated glass plate was evaluated as follows.

(Evaluation)

1) Film thickness: The cross section of the film was observed by a scanning electron microscope (S-800, manufactured by Hitachi, Ltd.), and from the obtained observation image, the thickness (nm) was obtained.

2) Amount of nitrogen in the film (N/Si) (at %): Measured by X-ray photoelectron spectroscopy, hereinafter sometimes referred to as XPS) using Quantum 2000 manufactured by ULVAC-PHI, Inc. as a measured apparatus. Measuring was carried out after subjecting the surface of the infrared shielding film after curing to sputter etching in an apparatus under the following sputtering conditions. The sputtering conditions and the measurement conditions are as follows.

| (Sputtering conditions) | |
|---|---|
| Sputtering ion: | Ar$^+$ |
| Accelerating voltage: | 4 kV |
| Raster size: | 2 × 2 mm$^2$ |
| Sputtering rate calculated as SiO$_2$: | 29.4 nm/min |
| Sputter etching time: | 5 min or 10 min |
| (Measuring conditions) | |
| X-ray source: | AlKα |
| Analysis area: | 100 μm in diameter |
| Sample angle: | 45° |
| Pass energy: | 117.4 eV |
| Energy step: | 0.5 eV/step |

The content (atomic ratio) of N to Si was determined using relative sensitivity coefficients (Si2p: 0.368, N1s: 0.499) from the integrated intensities (c/s) of Si2p and N1s peaks obtained by the above measurement after sputtering for 5 minutes and after sputtering for 10 minutes, and the average of values after sputtering for 5 minutes and sputtering for 10 minutes was obtained as the amount of nitrogen in the film (N/Si). However, in Example 8, the value after sputtering for 5 minutes was taken as the amount of nitrogen in the film (N/Si). As the calculation software, Multi Pack manufactured by ULVAC-PHI Inc. was used.

3) Film composition (ITO/matrix): The surface of the infrared shielding film after curing was subjected to sputter etching under the same sputtering conditions as in the above measurement of the amount of nitrogen in the film, and XPS measurement was carried out under the same measurement conditions as in the above measurement of the amount of nitrogen in the film. The ratio in the film of (In$_2$O$_3$+SnO$_2$)/

($SiO_2$+$TiO_2$) (corresponding to the mass ratio of (fine ITO particles)/(matrix)) was calculated using the relative sensitivity coefficients (Si2p: 0.368, In3d5: 4.530, Sn3d5: 4.890, Ti2p: 2.077) from the integrated intensities (c/s) of the respective peaks of Si2p, In3d5, Sn3d5 and Ti2p obtained by XPS measurement after sputtering for 5 minutes and after sputtering for 10 minutes.

4) ITO deposition amount: Amounts of In and Sn in the coating film after curing were measured by X-ray fluorescence spectrometry, and the deposition amount (g/m$^2$) of the fine ITO particles per 1 m$^2$ was determined by calculation from the obtained results.

5) Visible light transmittance (Tv): The transmittance of the infrared shielding film-coated glass of from 380 to 780 nm was measured by a spectrophotometer (U-4100, manufactured by Hitachi, Ltd.), and the visible light transmittance (%) was calculated in accordance with JIS R3212 (1998).

6) Solar energy transmittance (Te): The transmittance of the infrared shielding film-coated glass of from 300 to 2,100 nm was measured by a spectrophotometer (U-4100, manufactured by Hitachi, Ltd.), and the solar energy transmittance (%) was calculated in accordance with JIS R3106 (1998). Further, the infrared shielding performance in the present invention was represented by the performance of the solar energy transmittance.

7) Abrasion resistance: Using a Taber type abrasion resistance tester, a 1,000 rotation abrasion test was carried out by a CS-10F abrasion wheel in accordance with the method disclosed in JIS R3212 (1998), and the degree of scratches before and after the test was measured by the haze (haze value), and the abrasion resistance was evaluated by the increase (%) in haze.

8) Chemical resistance: A sulfuric acid solution of 0.05 mol/liter and a sodium hydroxide solution of 0.1 mol/liter were dropped on the coating film and left to stand at 25° C. for 24 hours, whereupon they were washed with water, and the changes in the appearance and properties as between before and after the test were monitored. The coating film of which the appearance and properties did not changed was rated as passed.

EXAMPLE 1

0.71 g of a xylene dispersion liquid A having 30 mass % of cubic fine ITO particles having an average primary particle diameter of 40 nm (manufactured by Fuji Titanium Industry Co., Ltd.) dispersed and 2.15 g of a xylene solution B containing 20 mass % of perhydropolysilazane (number average molecular weight: 1,000, Aquamica NP-110, tradename, manufactured by AZ Electronic Materials) were weighed, and they were mixed at room temperature and stirred for 10 minutes to obtain a coating fluid C.

The obtained coating fluid C was applied by a spin coating method to an ultraviolet-absorptive green glass (Tv: 73%, Te: 45%, transmittance to a light having a wavelength of 2.0 μm: 47%, 10 cm in length, 10 cm in width, 5 mm in thickness, common name UVFL, manufactured by Asahi Glass Company, Limited) the surface of which was cleaned, and dried in atmospheric air at 100° C. for 10 minutes and then cured in an oven maintained at 210° C. for 30 minutes to obtain an infrared shielding film-coated glass plate. The properties of the obtained infrared shielding film-coated glass plate were evaluated and the results are shown in Table 1.

As shown in Table 1, as a result of evaluation of the film composition, it was found that nitrogen was present in an amount of 7.2 at % based on silicon. Further, the increase in haze measured by the above method was so low as 2.0%.

EXAMPLE 2

0.71 g of a xylene dispersion liquid D having 30 mass % of hexagonal fine ITO particles having an average primary particle diameter of 29 nm (manufactured by Fuji Titanium Industry, Co., Ltd.) dispersed and 2.15 g of the above solution B were weighed, and they were mixed at room temperature and stirred for 10 minutes to obtain a coating fluid E.

An infrared shielding film-coated glass plate was prepared in the same manner as in Example 1 except that the above coating fluid E was used instead of the coating fluid C. The results of evaluation of the properties of the obtained infrared shielding film-coated glass plate are shown in Table 1.

EXAMPLE 3

0.48 g of the above dispersion liquid A, 1.51 g of the above solution B and 0.99 g of diisopropoxybis(ethylacetoacetate) titanium were weighed, and they were mixed at room temperature and stirred for 10 minutes to obtain a coating fluid F.

An infrared shielding film-coated glass plate was prepared in the same manner as in Example 1 except that the above coating fluid F was used instead of the coating fluid C and that the film thickness of the infrared shielding film after curing was changed as shown in Table 1. The results of evaluation of the properties of the obtained infrared shielding film-coated glass plate are shown in Table 1.

EXAMPLE 4

An infrared shielding film-coated glass plate was prepared in the same manner as in Example 1 except that after drying in atmospheric air at 155° C. for 30 minutes, the glass substrate was maintained in a constant temperature and constant humidity bath maintained at a temperature of 30° C. under a humidity of 55% for 4 weeks for curing, and that the film thickness of the infrared shielding film after curing was changed as shown in Table 1. The results of evaluation of the properties of the obtained infrared shielding film-coated glass plate are shown in Table 1.

EXAMPLE 5

Comparative Example 0.84 g of a condensate of tetramethoxysilane (methyl silicate 51), 0.54 g of a solvent mixture containing ethanol and xylene in a volume ratio of 50%/50%, and 0.77 g of a 0.1 mol/dm$^3$ nitric acid aqueous solution were mixed to prepare a solution G containing 20 mass % of $SiO_2$. 0.71 g of the above dispersion liquid A and 2.85 g of the above solution G were weighed, and they were mixed at room temperature and stirred for 10 minutes to obtain a coating fluid H.

An infrared shielding film-coated glass plate was prepared in the same manner as in Example 1 except that the above coating fluid H was used instead of the coating fluid C. The results of evaluation of the properties of the obtained infrared shielding film-coated glass plate are shown in Table 1.

As shown in Table 1, in Example 5 wherein the film contains no nitrogen, the infrared shielding film-coated glass plate is inferior in the infrared shielding property as compared with Examples of the present invention (Examples 1 to 4) even with an ITO deposition amount at the same level as in Examples.

EXAMPLE 6

Comparative Example

An infrared shielding film-coated glass plate was prepared in the same manner as in Example 5 except that the film thickness of the infrared shielding film after curing was changed as shown in Table 1. The results of evaluation of the properties of the obtained infrared shielding film-coated glass plate are shown in Table 1.

As shown in Table 1, in Example 6 wherein the film contains no nitrogen, it is required to use about 1.4 times the amount of ITO, so as to form a coating film having an infrared shielding property at the same level as in Examples of the present invention (Examples 1 to 4).

EXAMPLE 7

Comparative Example

An infrared shielding film-coated glass plate was prepared in the same manner as in Example 1 except that the film thickness of the infrared shielding film after curing was changed as shown in Table 1. The results of evaluation of the properties of the obtained infrared shielding film-coated glass plate are shown in Table 1.

As shown in Table 1, in Example 7 wherein the film thickness exceeds 3,000 nm, the visible light transmittance is low.

EXAMPLE 8

Comparative Example

An infrared shielding film-coated glass plate was prepared in the same manner as in Example 1 except that the film thickness of the infrared shielding film after curing was changed as shown in Table 1. The results of evaluation of the properties of the obtained infrared shielding film-coated glass plate are shown in Table 1.

As shown in Table 1, in Example 8 wherein the film thickness is less than 200 nm, no sufficient infrared shielding property can be obtained.

infrared shielding film-coated glass plate having both excellent infrared shielding property and visible light transmittance can be produced by a single film-forming process at a low cost, and thus it is suitable particularly for preparation of a glass plate for an automobile, a glass plate for building, etc.

The entire disclosure of Japanese Patent Application No. 2006-103366 filed on Apr. 4, 2006 including specification, claims, drawings and summary is incorporated herein by reference in its entirety.

What is claimed is:

1. An infrared shielding film-coated glass plate comprising:
    a glass substrate and
    an infrared shielding film formed thereon,
    wherein the infrared shielding film has a film thickness ranging from 200 to 3,000 nm and comprises:
        fine ITO particles having an average primary particle diameter of at most 100 nm dispersed in a matrix containing silicon oxide as the main component and
        nitrogen in an amount of at least 2 at % based on Si.

2. The infrared shielding film-coated glass plate according to claim 1, wherein the deposition amount of the fine ITO particles in the infrared shielding film is from 0.2 to 1.0 g/m$^2$.

3. The infrared shielding film-coated glass plate according to claim 1, wherein the mass ratio of the fine ITO particles to the matrix in the infrared shielding film is (fine ITO particles)/(matrix)=10/90 to 45/55.

4. The infrared shielding film-coated glass plate according to claim 1, wherein the haze of the infrared shielding film-coated glass plate is less than 1.0%.

5. The infrared shielding film-coated glass plate according to claim 1, which has a visible light transmittance of at least 70% as stipulated in JIS R3212 (1998).

6. The infrared shielding film-coated glass plate according to claim 1, wherein part of the silicon oxide in the infrared shielding film is substituted by titanium oxide.

7. The infrared shielding film-coated glass plate according to claim 1, wherein the nitrogen content in the infrared shielding film ranges from 2 at % to 20 at %.

8. The infrared shielding film-coated glass plate according to claim 1, wherein the nitrogen content in the infrared shielding film is at least 3 at %.

9. The infrared shielding film-coated glass plate according to claim 1, wherein the nitrogen content in the infrared shielding film is at least 5 at %.

TABLE 1

|  | Film thickness | N/Si | ITO/matrix | ITO deposition amount | Tv | Te | Haze | Increase in haze | Chemical resistance |
|---|---|---|---|---|---|---|---|---|---|
| Example 1 | 700 | 7.2 | 25/75 | 0.39 | 72 | 40 | 0.3 | 2.0 | Passed |
| Example 2 | 700 | 7.0 | 25/75 | 0.39 | 72 | 41 | 0.3 | 2.0 | Passed |
| Example 3 | 800 | 11.0 | 25/75 | 0.41 | 71 | 39 | 0.4 | 2.2 | Passed |
| Example 4 | 750 | 3.8 | 25/75 | 0.39 | 72 | 40 | 0.3 | 1.8 | Passed |
| Example 5 | 700 | <0.1 | 25/75 | 0.39 | 72 | 43 | 0.3 | 4.1 | Passed |
| Example 6 | 1150 | <0.1 | 25/75 | 0.56 | 71 | 40 | 0.3 | 4.3 | Passed |
| Example 7 | 3500 | 14.6 | 25/75 | 1.40 | 69 | 38 | 0.5 | 3.1 | Passed |
| Example 8 | 150 | 2.8 | 25/75 | 0.10 | 73 | 44 | 0.2 | 1.5 | Passed |

The infrared shielding film-coated glass plate of the present invention has excellent infrared shielding property and visible light transmittance, and is applicable to a site where mechanical and chemical durability is highly required, such as a door glass plate for an automobile. Further, according to the production process of the present invention, an 10. The infrared shielding film-coated glass plate according to claim 1 that is produced by a process comprising:
    applying a dispersion liquid comprising fine ITO particles having an average primary particle diameter of at most 100 nm in a content of from 1 to 10 mass % based on the total mass, a nitrogen-containing silicon compound capable of forming a silicon oxide gel and an organic solvent, to the surface of a glass substrate to form a fine ITO particles-dispersed layer containing the nitrogen-containing silicon compound and/or containing a gel of the nitrogen-containing silicon compound, and curing the above layer.

11. A window comprising the infrared shielding film-coated plate according to claim 1.

12. An automobile window comprising the infrared shielding film-coated plate according to claim 1.

13. A process for producing the infrared shielding film-coated glass plate of claim 1, which comprises:

a step of applying a dispersion liquid comprising fine ITO particles having an average primary particle diameter of at most 100 nm in a content of from 1 to 10 mass % based on the total mass, a nitrogen-containing silicon compound capable of forming a silicon oxide gel and an organic solvent, to the surface of a glass substrate to form a fine ITO particles-dispersed layer containing the nitrogen-containing silicon compound and/or containing a gel of the nitrogen-containing silicon compound, and a step of curing the above layer.

14. The process for producing an infrared shielding film-coated glass plate according to claim 13, wherein the mass ratio of the fine ITO particles to the nitrogen-containing silicon compound in the dispersion liquid is (fine ITO particles)/$(SiO_2)$=10/90 to 45/55.

15. The process for producing an infrared shielding film-coated glass plate according to claim 13, wherein the nitrogen-containing silicon compound is a polysilazane.

16. The process for producing an infrared shielding film-coated glass plate according to claim 15, wherein in the step of curing the layer, the nitrogen-containing silicon compound in the fine ITO particles-dispersed layer is cured by moisture in the atmosphere.

17. The process for producing an infrared shielding film-coated glass plate according to claim 13, wherein in the step of curing the layer, the glass substrate having a fine ITO particles-dispersed layer formed thereon is heated at such a temperature that the glass substrate temperature is at most 300° C. to cure the nitrogen-containing silicon compound.

* * * * *